June 18, 1946.     R. P. DEWEY     2,402,151
CONTROL INSTRUMENT
Filed July 27, 1942     2 Sheets-Sheet 1
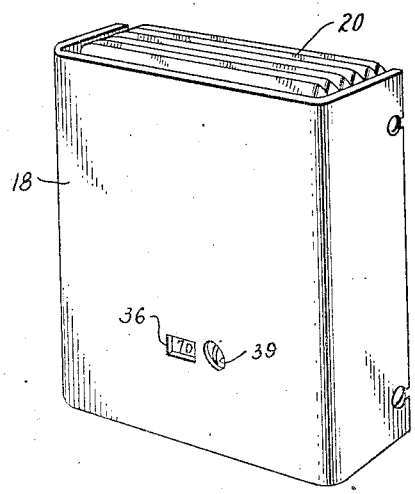
Fig. 1.
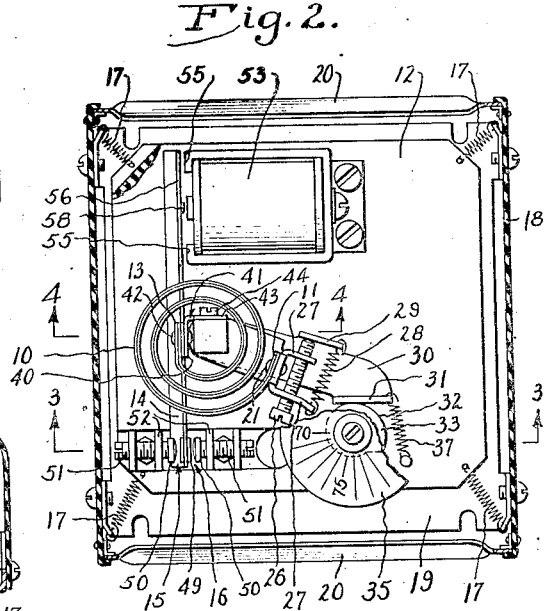
Fig. 2.
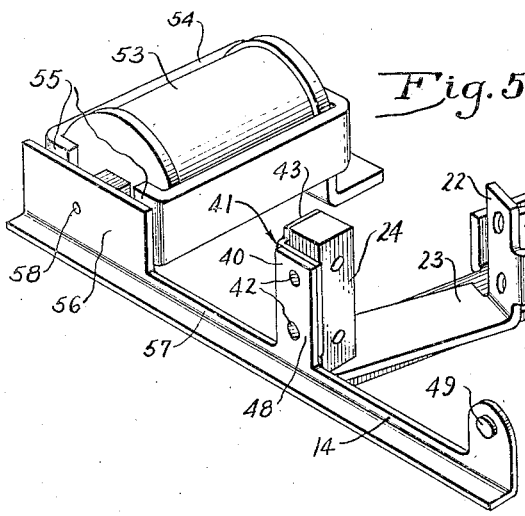
Fig. 3.
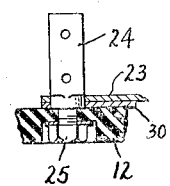
Fig. 4.
Fig. 5.
INVENTOR
Ritchie P. Dewey
BY
Parker, Carlson, Pitzner & Hubbard
ATTORNEYS

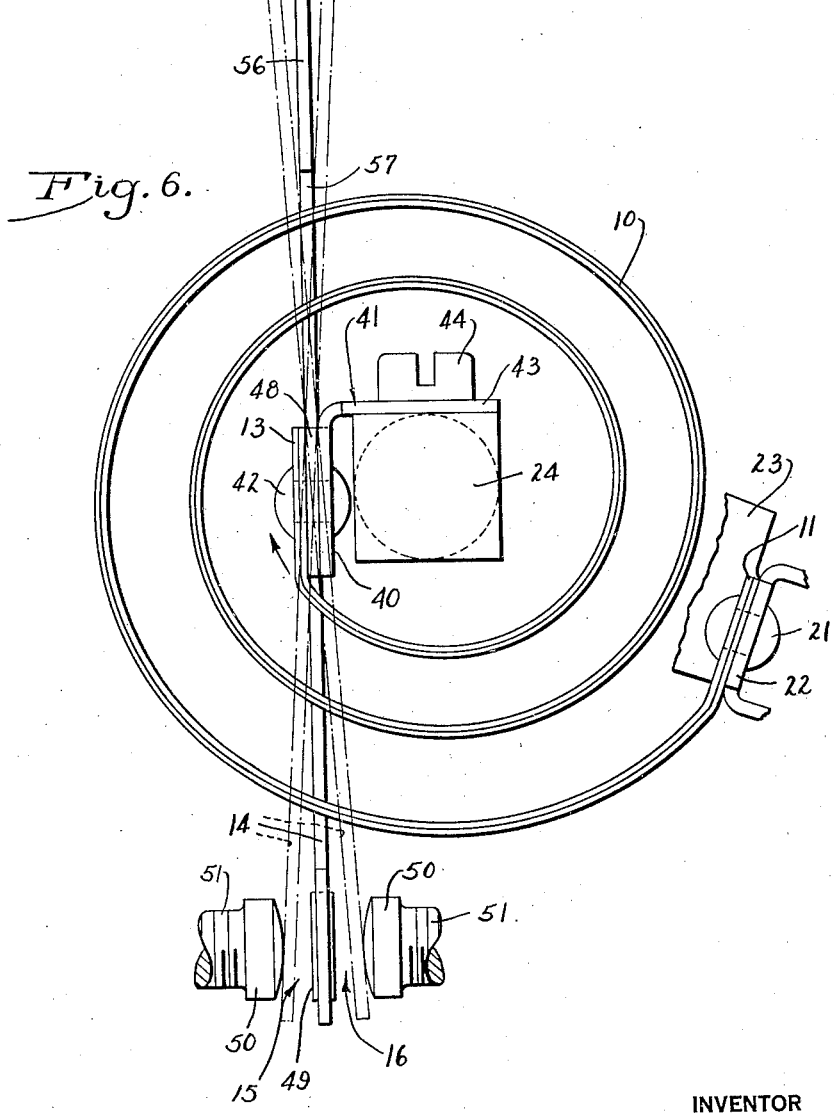

UNITED STATES PATENT OFFICE 2,402,151

CONTROL INSTRUMENT

Ritchie P. Dewey, Rockford, Ill., assignor to Barber-Coleman Company, Rockford, Ill., a corporation of Illinois Application July 27, 1942, Serial No. 452,452

14 Claims. (Cl. 200—139)

This invention relates to control instruments which respond automatically to changes of a condition such as temperature, humidity, etc., and actuate a switch or other control device to perform a control function. In prior instruments of this character, the condition responsive element is usually supported from one end, the other or overhanging end being free to move with the condition changes and also being influenced by vibration of the mounting. Detents or the like are commonly provided to overcome the effect of vibration but the use of these results in a substantial decrease in the sensitivity of the instrument.

The primary object of the present invention is to provide a control instrument of the above character which is much more sensitive than prior instruments of the same general character.

A further object is to provide a frictionless support for the free end of the condition responsive element which support resists motion in substantially all directions except that in which the end is moved in response to condition changes.

A more detailed object is to support the movable end of the condition responsive or motion transmitting element through the medium of a flexible member which is adapted to bend readily in the direction in which the end moves in response to condition changes.

The invention also resides in the novel character of the mounting above described by which extreme flexibility of said member is obtained.

A further object is to mount the condition responsive element in a novel manner to prevent damage to the instrument by extreme variations of ambient conditions.

Other objects and advantages of the invention will become apparent from the following detailed description taken in connection with the accompanying drawings, in which Figure 1 is a perspective view of a condition responsive instrument embodying the present invention.

Fig. 2 is an elevational view with the cover removed.

Figs. 3 and 4 are sections taken respectively along the lines 3—3 and 4—4 of Fig. 2.

Fig. 5 is a fragmentary perspective view of the supporting and motion transmitting parts.

Fig. 6 is an enlarged fragmentary view of the condition responsive element.

Fig. 7 is a perspective view of the flexible supporting member.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the illustrative embodiment, the invention is embodied for purposes of illustration in a thermostat or a humidistat having a condition responsive element in the form of a spirally coiled laminated strip 10 adjustably supported at one end 11 from a base plate 12 and connected at its free or movable end 13 to an arm 14 by which the motion due to condition changes is transmitted to one or more control devices comprising switches 15 and 16 in the present instance. To minimize the effect of external vibration, the base 12, which is composed of insulating material, is suspended by contractile springs 17 from the corners of a plate 19 on which a cover 18 is removably mounted. Grilled openings 20 at opposite ends of the casing permit of the free circulation of air therethrough.

If the instrument is to respond to ambient temperature changes, the element 10 is formed as a strip or band of bimetal. If the element is to detect humidity changes, one lamination may be a thin metal ribbon and the other of a ribbon of material such as paper glued to the metal ribbon and adapted to expand or contract with changes in its moisture content. In either case, with the element end 11 supported rigidly, the free end 13 will move back and forth along a predetermined arcuate path indicated by the arrow in Fig. 6 with changes in the ambient condition to which the element is adapted to respond.

The end 11 of the element is mounted in a special way to permit of manual adjustment of the instrument control point and yielding movement of the end in either direction so as to avoid damage to the element when the latter is subjected to abnormal condition changes. For this purpose, the end 11 is secured by rivets 21 to the upstanding end 22 of an arm 23 pivoted at its other end on the rounded portion of a post 24 which is fastened to the base 12 by a nut 25 (Fig. 4). A manually adjustable screw 26 threads through flanges 27 on the arm end 22 and its end is urged by a contractile spring 28 against a flange 29 upstanding from a lever 30 pivoted on the stud 24 beneath the arm 23. A flange 31 on the other end of the lever bears against the periphery 32 of a cam 33 which is fast on a stud 34 journaled in the base 12 and carrying an indicator dial 35 having indicia thereon which are visible through a window 36 in the cover 18. The follower 31 is held against the cam by a contractile spring 37 and the cam is shaped so that the lever 30 will occupy different positions of adjustment depending on the angular position of the cam. Such adjustment may be effected by a tool inserted through a hole 39 and engaging the head of the stud 34.

The arrangement above described not only provides for manual adjustment of the instrument control point by turning the disk 35 or by turning the screw 26 but also permits the end 11 of the element 10 to yield in either direction under abnormal stress created by a wide condition deviation after the arm 14 has engaged one of the stationary contacts. When the abnormal force is clockwise, the end 11 moves away from the flange 29 as permitted by stretching of the spring 28. Counterclockwise stressing of the element 10 causes the follower 31 to move away from the cam 33 by stretching of the spring 37.

To minimize the effect of vibration, the end 13 of the element 10 is rigidly connected to the free end of a flexible member 41 mounted on the post 24 and adapted to bend and permit free movement of the end 13 along the predetermined line in response to condition changes. In the form shown herein, the flexible member 41 (see Fig. 7) comprises a right angular strip of resilient beryllium-copper approximately .005 of an inch thick having one end 40 secured by rivets 42 to the element end 13. The other end 43 is clamped by screws 44 to one flat side of the stud 25 leaving the corner of the strip free to bend. To locate the axis of bending along this corner and to increase the flexibility with a strip of substantial width (21/32 of an inch in the present instance), the strip is cut away to form an aperture 45 at the corner. This leaves two quite widely spaced right angular portions 46 supporting the element end 13 for frictionless movement by bending of the parts about corner axis in response to changes in the internal stress of the element created by condition changes. Movement of the element end 13 in all other directions is thus resisted by the member 41 thereby minimizing the tendency of the overhanging end to vibrate.

The motion of the element end 13 in response to condition changes is amplified and transmitted to the switches 15 and 16 through the arm 14 which is rigid and straight and has a lug 48 intermediate its ends clamped by the rivets 42 between the element end 13 and the end 40 of the member 41. Thus the arm 14 is swingable with the element end 13 about the corner axis and in a plane parallel to the plane of the element coil. At one end, the arm 14 carries a contact 49 which is disposed between and cooperates with contacts 50 to form the switches 15 and 16, the latter contacts being on screws 51 threading through U-shaped pieces 52 which are rigid with and upstand from the base 12.

For use in the control of so-called proportioning systems, electro-magnetic means is provided for enabling the control point of the instrument to be varied progressively. Herein, the magnet indicated generally at 53, is formed with an E-shaped core 54 mounted rigidly on the base 12. The pole faces 55 are disposed in a common plane parallel to the contact arm 14 and coact with an armature 56 carried by an extension 57 of the arm 14 alined therewith and projecting in the opposite direction from the supporting post 24. The armature carries a non-magnetic projection 58 engageable with the central pole face to prevent the armature from freezing against the poles.

By varying the energization of the magnet, the stress in the condition-responsive element 10 may be varied thereby producing a corresponding change in the control point of the instrument, that is, the ambient temperature at which the arm 14 moves to close or open one of the switches. Since the arm 14 and its integral extension 57 are supported by the flexible member 41 at the center, the overhanging weight is evenly balanced thereby minimizing the tendency to vibrate.

I claim as my invention:

1. A control instrument having, in combination, a spirally coiled band of condition responsive material supported at one end for movement of its other end in opposite directions in response to opposite ambient condition changes, a flexible strip supported at one end to permit freedom of movement of its other end along the path of movement of said band end, said other ends of said band and strip being rigidly connected to move in unison in response to condition changes whereby the free end of the band is supported by the strip against vibration in all other directions, an arm rigidly joined to said connected ends and supported solely by said strip to swing in a plane offset from and parallel to said coiled band, and a control device actuated by movement of said arm.

2. A control instrument having, in combination, a spirally coiled band of condition responsive material supported near one end for movement of its other end in opposite directions in response to opposite ambient condition changes, a flexible strip supported near one end for free movement of its other end along the path of movement of said band end, said other ends of said band and strip being rigidly connected to move in unison in response to condition changes, said other band end being thereby supported by the strip against vibration in all other directions, and a control device actuated by movement of said connected ends.

3. A control instrument having, in combination, an L-shaped piece of flexible sheet metal apertured at its corner to cause flexing of said piece about an axis extending along the corner, means rigidly supporting said piece at one end, a condition responsive element stationarily supported at one end and having its other end connected to and supported by the other end of said piece for movement therewith in response to condition changes, a control device, and an arm rigidly connected to and supported by said other end of said piece and having its other end operatively associated with said control device.

4. A control instrument having, in combination, a condition responsive element having an end movable along a predetermined path in response to opposite condition changes, a strip of material having a thickness on the order of a few thousandths of an inch and bent intermediate its ends to define an axis of flexure along the line of the bend, one of said strip ends being rigidly connected to said element end whereby the strip constitutes the sole means of supporting such end, means rigidly supporting the other end of the strip to permit free movement of said connected ends about said axis and along said path, and a control device actuated by movements of said connected ends.

5. A control instrument having, in combination, a condition responsive element having an end movable along a predetermined path in response to opposite condition changes, a thin flexible sheet of material having an aperture intermediate its ends dividing the sheet into opposite end portions connected by two strips, means rigidly supporting said sheet from one of said end portions with the other end connected to the movable end of said element whereby to permit movement of the element end along said path by flexure of said sheet along an axis extending across said strips, and a control device actuated in response to movements of said connected ends.

6. A control instrument having, in combination, a condition responsive element having an end movable along a predetermined path in response to opposite condition changes, a strip of material bent intermediate its ends to define an axis of flexure along the line of the bend, one of said strip ends being rigidly connected to said element end whereby the strip constitutes the sole means of supporting such end, means rigidly supporting the other end of the strip to permit free movement of said connected ends about said axis and along said path, and a control device actuated by movement of said connected ends.

7. A control instrument having, in combination, first and second levers swingable about a common fixed pivot, said first lever having an abutment thereon, a condition responsive element carried by the second lever and having a movable end, control means associated with said end of said element and limiting the motion thereof in two directions, a screw threaded into said second lever and engaging said abutment to determine the angular relation of the levers, spring means urging said levers relative to each other in a direction to maintain engagement of the screw and abutment, a cam member engageable with said first lever and movable to vary the angular position of the latter and thereby adjust the control point of the instrument, and spring means yieldably holding said first lever in engagement with said cam, one or the other of said spring means yielding to avoid straining of said element under an abnormal condition deviation in either direction.

8. A control instrument having, in combination, first and second levers swingable about a common fixed pivot, a condition responsive element having one portion fixed to said second lever, a second portion movable relative to said second lever in response to condition changes, control means associated with said movable portion, means providing abutting engagement between said levers and selectively adjustable to vary the angular relation thereof, spring means maintaining said engagement, stationarily mounted means having abutting engagement with said second lever and selectively adjustable to vary the angular positions of the two levers as a unit, spring means yieldably maintaining said second abutting engagement, one or the other of said spring means yielding to avoid straining of said element under an abnormal condition deviation in either direction.

9. A control instrument having, in combination, two members movable relative to each other in a predetermined direction, condition responsive element carried by one of the members and movable at one end, control means associated with the said end of said element, a pair of abutments on said members, one being adjustable, a stationarily mounted abutment and a cooperating abutment on one of said members, one being selectively adjustable, and separate spring means normally maintaining the pairs of abutments in engagement and yieldable in response to abnormal stressing of said element to permit separation of the abutments of one pair.

10. A control instrument having, in combination, a condition responsive element, means supporting one part of said element to cause movement of a second part with condition changes, a flexible sheet having two end portions extending at angles relative to each other and adapted to flex relative to each other about an axis extending along the junction of the two portions, means rigidly supporting one of said end portions at a point spaced from said axis, means rigidly connecting the end of the other portion and said second part of said element, an arm rigidly connected intermediate its ends to said last mentioned end portion so that its opposite ends substantially balance each other, and control means associated with one end of said arm.

11. A control instrument having, in combination, a base, a projection rigid with and upstanding from said base, a thin readily flexible member permanently bent intermediate its ends so that opposite end portions are disposed at substantial angles relative to each other, one end portion being rigidly secured to said projection for flexure of the other end portion about an axis extending along the bend and toward the base, a tongue connected to the other end portion of said member, a control device having relatively movable parts, one of which is carried by said tongue, a condition responsive means carried by said base and having one part movable in opposite directions relative to the base in response to opposite condition changes and along the path in which said tongue swings, and means connecting the movable part of said condition responsive means to said tongue.

12. A control instrument having, in combination, a base, a projection rigid with and upstanding from said base, a thin readily flexible member having one end portion rigidly secured to said projection for lateral flexure of the other free end portion, a bimetallic strip coiled into the form of a multiple turned spiral, means on said base fixedly supporting the outer end portion of said spiral strip, means rigidly connecting the inner end portion of said strip to said free end portion of said flexible member for movement of such end portion by warpage of the strip in response to ambient temperature changes, and a control device supported by said flexible member and movable in opposite directions by bending of said free end portion.

13. A control instrument having, in combination, a base, a projection rigid with and upstanding from said base, a thin readily flexible member having one end portion rigidly secured to said projection for lateral flexure of the other free end portion, a curved bimetallic strip coiled around said projection and having one end disposed adjacent and rigidly connected to the free end portion of said flexible member, means fixedly supporting the other end of said strip on said base to locate the line of movement of the free end of the strip in the direction of flexure of the free end portion of said member, and a control device actuated by flexure of said member by said strip including an arm rigidly connected to the free end of said member for movement therewith.

14. A control instrument having, in combination, a base, a projection rigid with and upstanding from said base, a thin readily flexible member having one end portion rigidly secured to said projection for lateral flexure of the other free end portion, a strip of material adapted to bend laterally in response to ambient condition changes, means rigidly connecting one end portion of said strip to the free end portion of said flexible member, means on said base fixedly supporting the other end of the strip to locate the line of movement of the free end of the strip in the general direction of flexure of the free end portion of said member, and a control device actuated by flexure of said member by said strip including an arm rigidly connected to the free end of said member for movement therewith.

RITCHIE P. DEWEY.